No. 768,073. PATENTED AUG. 23, 1904.
A. M. PLAISSETTY.
MANUFACTURE OF INCANDESCENT FILAMENTS AND MANTLES.
APPLICATION FILED MAY 9, 1902.
NO MODEL.
*Made by soaking lustra cellulose in illuminating salt solution, drying and hydrating with amonia.*
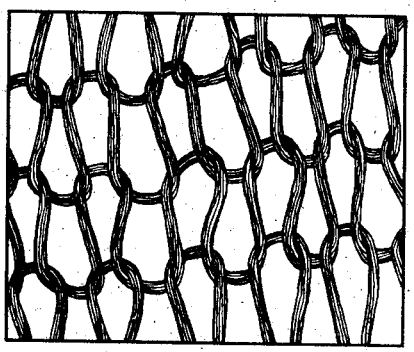
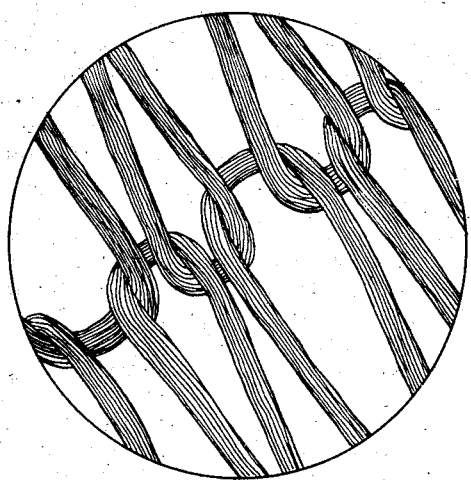
Witnesses:
Ray White
Harry R. L. White
Inventor
Achille M. Plaissetty
By Brown + Darby
Attys No. 768,073. Patented August 23, 1904.

UNITED STATES PATENT OFFICE.

ACHILLE MARIE PLAISSETTY, OF PARIS, FRANCE.

MANUFACTURE OF INCANDESCENT FILAMENTS AND MANTLES.

SPECIFICATION forming part of Letters Patent No. 768,073, dated August 23, 1904.

Application filed May 9, 1902. Serial No. 106,663. (No model.)

*To all whom it may concern:*

Be it known that I, ACHILLE MARIE PLAISSETTY, a citizen of the United States of America, residing at Paris, France, have invented certain new and useful Improvements in or Relating to the Manufacture of Incandescent Filaments and Mantles, of which the following is a specification.

The present invention relates to improvements in the manufacture of incandescent filaments and mantles.

The drawing illustrates portions of a mantle composed of filaments made in accordance with the principles of my invention.

A practical embodiment of my invention may be carried out as follows: Artificial cellulose—that is to say, lustra-cellulose (commonly called "artificial silk") ordinarily formed by drawing nitrocellulose or any solution of cellulose into threads and denitrating or drying the same—is soaked or impregnated with a concentrated solution of salts of the illuminating metals until the solution of salts has completely permeated the fiber. The fiber is then dried and afterward passed into a strong solution of ammonia-gas, preferably of a specific gravity .88, or other suitable alkali. The result is the decomposition of the salt throughout the structure of the fiber and the production of hydrated oxids, which hydrated oxids enter into some combination with the lustra-cellulose not well understood. The fiber is then washed to remove the nitrates of ammonia formed in the filament, again dried, and knitted or woven into mantles.

The artificial silk may be obtained by any of the well-known processes, and I prefer to use it of a thickness of from one hundred and thirty to one hundred and eighty deniers, (thirty-eight thousand six hundred and forty to twenty-seven thousand seven hundred and twenty yards to the pound,) although, of course, results may be obtained with artificial silk coarser or finer.

By incorporating the hydrated oxids with the lustra-cellulose according to this invention such a large percentage of oxids is introduced that a burned mantle weighs from twenty-eight per cent. to forty-two per cent. of an unburned mantle, and yet the thread is kept sufficiently strong. The large percentage of inorganic matter also greatly adds to the solidity of the mantle when made. Moreover, it is found that by drying the fibers and immersing them in ammonia before burning the skeleton produced is much stronger than any mantles hitherto produced. The mantle is also exceedingly supple and very elastic and insensible to moisture. Its light-giving power falls off very slowly as compared with that of mantles at present in use.

In this mantle after burning the oxids appear in the form of a granular compact material instead of a pulverulent body, as in the case of cotton mantles.

What I claim as my invention, and desire to secure by Letters Patent, is—

1. The herein-described process of manufacturing incandescent mantles which consists in soaking fibers of lustra-cellulose in a solution of illuminating salts, drying the fibers, transforming the salts into hydrated oxids by ammonia and forming mantles from the fibers.

2. The herein-described process of manufacturing incandescent mantles which consists in soaking fibers of lustra-cellulose in a solution of illuminating salts, drying the fibers, transforming the salts into hydrated oxids by ammonia, washing the ammonia salts formed, drying and forming the fibers into mantles.

3. The herein-described process of manufacturing incandescent mantles which consists in soaking fibers of lustra-cellulose in a solution of illuminating salts until the fiber contains sufficient oxids to form twenty-eight per cent. to forty-two per cent. of the unburned mantle, drying the fibers, transforming the salts into hydrated oxids by ammonia, washing out the ammonia salts formed, drying and forming the fibers into mantles.

4. As an article of manufacture, an incandescent mantle composed of lustra-cellulose fibers, impregnated with ammonia hydrated oxids transformed from illuminating salts.

5. As an article of manufacture, an incandescent mantle composed of lustra-cellulose fibers, impregnated with ammonia hydrated oxids transformed from illuminating salts and free from ammonia salts.

6. The process of making filaments for incandescent mantles, which consists in forcing a solution of cellulose through a fine aperture, impregnating with a solution of the illuminating salts, drying and transforming the salts into hydrated oxids by ammonia, as and for the purpose set forth.

7. The process of making filaments for incandescent mantles, which consists in denitrating nitrocellulose, then impregnating the same with a solution of the illuminating salts, drying, and transforming the salts into hydrated oxids, by ammonia as and for the purpose set forth.

8. The process of making filaments for incandescent mantles, which consists in first drawing nitrocellulose into threads, drying and denitrating, impregnating with solutions of the illuminating salts, drying and hydrating the impregnating salts by ammonia, as and for the purpose set forth.

In testimony whereof I have signed my name to this specification in the presence of two subscribing witnesses.

ACHILLE MARIE PLAISSETTY.

Witnesses:
   EDWARD P. MACLEAN,
   GEORGE E. LIGHT.